Jan. 19, 1932. A. P. BUQUOR 1,841,709
COMPOUND SPRING SUSPENSION AND LOAD EQUALIZING MEANS FOR MOTOR VEHICLES
Filed March 24, 1930 2 Sheets-Sheet 1
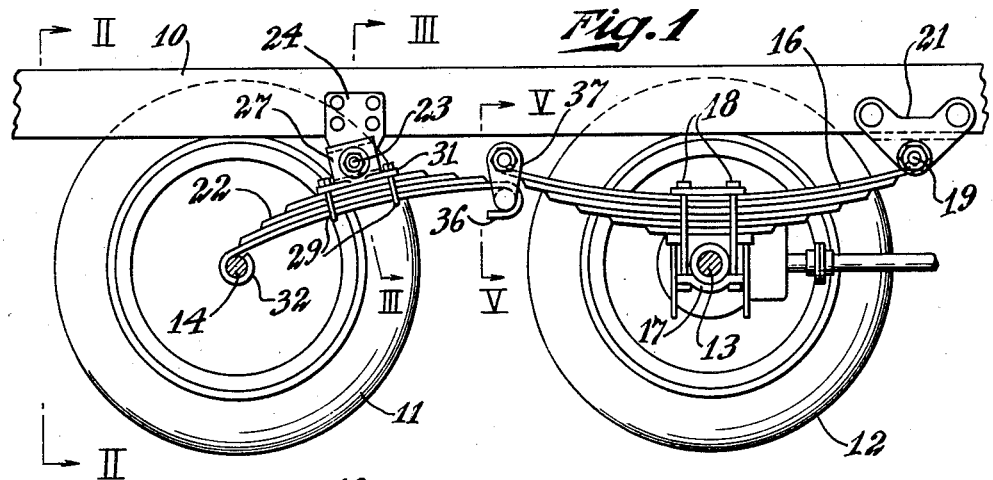
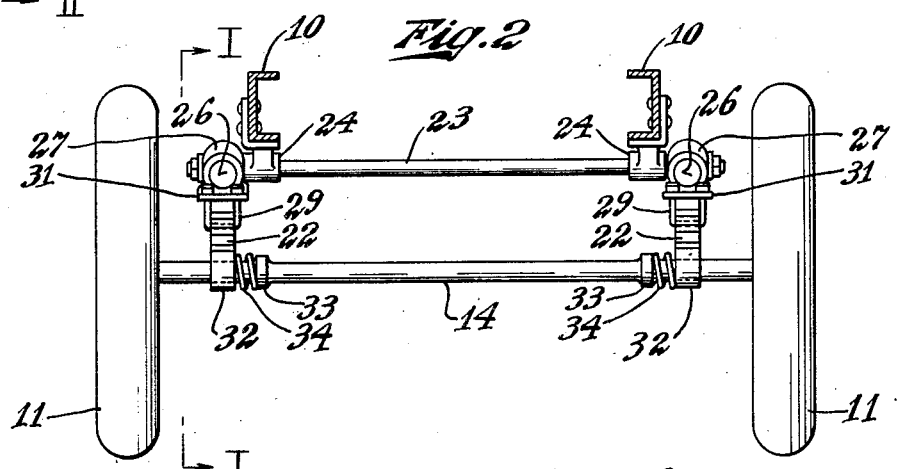
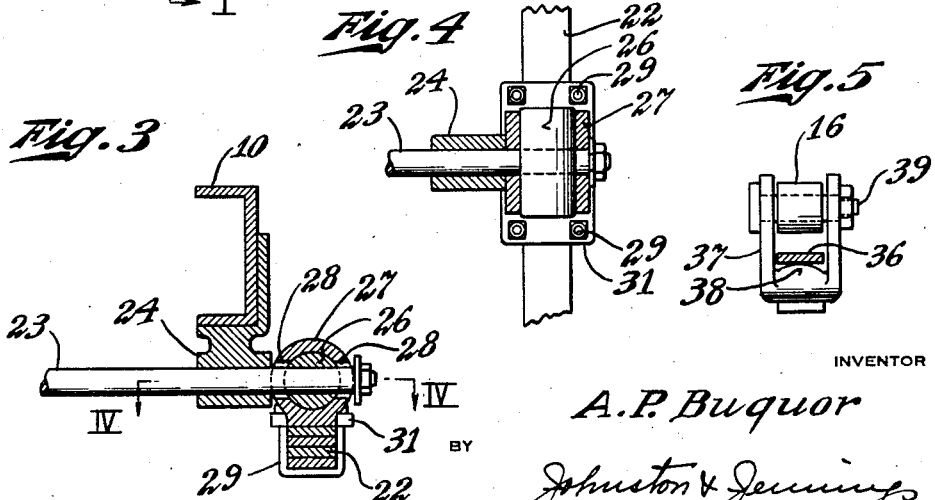
INVENTOR
A. P. Buquor
BY
Johnston & Jennings
ATTORNEYS
WITNESS
Charles H. Bassett Jan. 19, 1932. A. P. BUQUOR 1,841,709
COMPOUND SPRING SUSPENSION AND LOAD EQUALIZING MEANS FOR MOTOR VEHICLES
Filed March 24, 1930 2 Sheets-Sheet 2
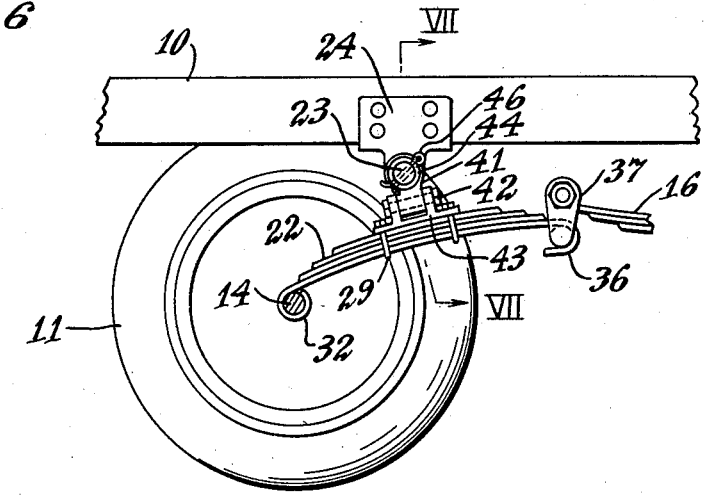
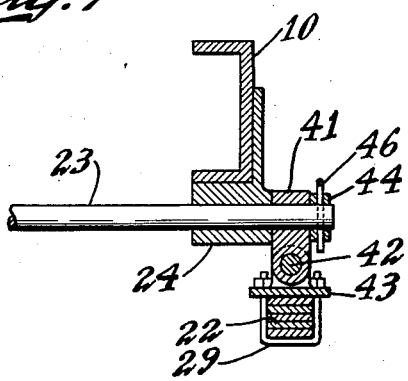
INVENTOR
A. P. Buquor
WITNESS
ATTORNEYS Patented Jan. 19, 1932

1,841,709

UNITED STATES PATENT OFFICE

ADOLPH P. BUQUOR, OF LOS ANGELES, CALIFORNIA, ASSIGNOR OF ONE-HALF TO CLARENCE R. MEDLEY, OF COLUMBUS, GEORGIA

COMPOUND SPRING SUSPENSION AND LOAD EQUALIZING MEANS FOR MOTOR VEHICLES

Application filed March 24, 1930. Serial No. 438,592.

My invention relates to a spring suspension and load equalizing means for motor vehicles, and has for its object the provision of apparatus of the character designated which shall be simple and sturdy of design, coupled with extreme flexibility in operation.

A further object of my invention is to provide a compound spring suspension and load equalizing system for motor vehicles, having tandem pairs of rear wheels, in which unequal vertical displacement of the wheels may occur without the imposition of torsional strain upon the springs, their connecting parts, or the chassis.

A still further object of my invention is to provide a means for attaching a tandem pair of wheels to the rear of an ordinary four-wheel motor vehicle together with a spring suspension and load equalizing system embodying improved means, whereby tire slippage of the rear wheels is minimized in rounding curves.

In carrying out my invention, I provide a motor vehicle with tandem pairs of rear wheels, one pair of which is motor driven. These wheels are connected to the frame by means of two laminated leaf springs on each side of the vehicle, one of which is connected intermediate its ends to the power driven axle, and at one end to the frame. The other spring is connected at one end to the trailing axle, at its other end to the other spring, and intermediate its ends to the vehicle frame. This manner of connecting the spring to the wheel axles and the frame serves to provide a proper equalization of the load on the axles.

It is important that the connection to the trailing axle be such as to maintain proper linear spacing between the power driven axle and the trailing axle, and at the same time permit unequal vertical displacement of the wheels without imposing undue strain upon the spring suspension or load equalizing mechanism, or upon the vehicle frame. I accomplish this in accordance with my invention by connecting the trailing axle springs to the frame by means of a novel form of universal joint, whereby the spring is permitted a limited rocking movement relative to the frame. The connections between the trailing axle springs and the power driven axle springs are also made by means of a novel form of spring shackle, which permits relative angular movement of the springs.

In addition to the improved spring suspension and load equalization features of my invention, I provide means for minimizing side slippage and wear on the tires of the tandem wheels in rounding curves and for improved tracking of the trailer wheels. This is accomplished by means of a laterally yielding connection between the trailing axle springs and the trailing axle. The trailing axle springs accordingly are so constructed and connected to the vehicle frame and to the axle, that proper linear spacing of the vehicle wheels is maintained while permitting free vertical displacement and a limited lateral movement of the trailing wheels with respect to the frame.

Apparatus embodying features of my invention is illustrated in the accompanying drawings, forming a part of this application, in which Fig. 1 is a sectional elevation taken along the line I—I of Fig. 2;

Fig. 2 is a sectional view taken along the line II—II of Fig. 1;

Fig. 3 is a detail sectional view taken along the line III—III of Fig. 1;

Fig. 4 is a sectional view taken along the line IV—IV of Fig. 3;

Fig. 5 is a detail sectional view taken along the line V—V of Fig. 1; and

Figs. 6 and 7 show a modified form of the universal connection illustrated in Figs. 3 and 4.

Referring now to the drawings for a better understanding of my invention, I show in Figs. 1 and 2 a vehicle frame embodying longitudinal members 10. Disposed beneath the frame are tandem pairs of wheels 11 and 12, only one of the pair 12 being shown. The wheels 12 are mounted upon a power driven axle 13, while the wheels 11 are mounted upon a trailing axle 14. For convenience of description, the axle 13 will be considered the forward axle, as being toward the forward end of the vehicle, while the trailing axle 14 will be considered as the rear axle.

Mounted on the driving axle 13, on each side of the vehicle, is a laminated spring equalizer member 16 connected to the axle 13 by means of a split sleeve 17 and suitable bolts 18. The forward end of the spring equalizer 16 is connected by a bolt 19 to a bracket 21 secured to the longitudinal frame member 10 on each side of the vehicle.

To the rear of the spring equalizer member 16, and intermediate the trailing and driver wheels 11 and 12, on each side of the vehicle, is a second spring equalizer member 22. The spring equalizer members 22 are connected to the frame members 10 by a universal joint, permitting angular movement of the equalizer member about its long and short axes. This connection comprises a shaft 23 which extends across the vehicle and which is mounted in brackets 24 secured to the vehicle frame members 10. On each end of the shaft 23 is a cylindrical bearing member 26, through which the shaft 23 extends, and which is pivotally movable on said shaft. Surrounding the cylindrical member 26 is a sleeve 27 provided with a vertically elongated slot 28, the sides of which fit snugly against the shaft 26. The sleeve 27 is secured to the spring equalizer member 22 by means of U-bolts 29 extending upwardly through suitable lugs 31 formed on the lower side of the sleeve 27.

The rear end of the spring equalizer member 22 is provided with a loop 32 which slidingly fits around the axle 14 so as to permit relative lateral movement of the axle in the loop. The axle 14 is provided with shoulders 33 in spaced relation to the loops 32, and I interpose coiled springs 34 between said shoulders and said loops, whereby to yieldingly hold the trailing wheels in their proper positions laterally with respect to the driving wheels, and at the same time permit lateral displacement in rounding curves.

The forward ends of the spring equalizer member 22 are each provided with a hook portion 36 which passes around the lower end of a shackle 37, shown in detail in Fig. 5. The lower end of the shackle 37 is provided with an arcuate bearing portion 38 against which the hook 36 bears, so that there is permitted relative angular movement between the shackle and the spring equalizer 22. The upper end of the shackle 37 is connected by means of the well known shackle bolt 39.

Referring to Figs. 6 and 7 of the drawings, I show a modified form of the universal connection illustrated in Figs. 3 and 4. This connection embodies a connecting link 41 which is pivotally mounted at its one end on the shaft 23 and at its other end on a bolt 42. The bolt 42 is mounted in the spring bracket 43, and extends at a right angle to the shaft 23. The connecting link 41 is held in position on the shaft 23 by a collar 44 and a cotter pin 46.

Having thus described my invention, the advantages and operation thereof will be apparent. The compound spring suspension and equalizing system described serves to properly distribute the load on the driving and trailer axles, while permitting the utmost flexibility of operation and relative vertical displacement of the wheel, due to unevenness of the road. The universal joint connection between the spring equalizers 22 and the frame allows for relative vertical displacement of the trailer wheels with respect to the frame and with respect to the driving wheels without the imposition of any undue torsional strain upon the spring suspension system, or upon the vehicle frame. The provision for lateral movement of the axle 14 in the ends of the spring equalizers 22 reduces side strain upon the tires of the tandem pairs of wheels and improves tracking of the wheels in rounding curves. At the same time, the proper linear spacing of the wheels is maintained, by connections between the spring equalizers 22 and the frame.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In a spring suspension and load equalizing system for motor vehicles embodying a frame and tandem pairs of wheels, a power driven axle for one pair of wheels, a trailing axle for the other pair of wheels, a resilient equalizer member on each side of the vehicle secured intermediate its ends to the power driven axle, means connecting the end of the equalizer member remote from the trailing axle to the frame, a second resilient equalizer member pivotally connected intermediate its ends to the frame for universal movement on each side of the vehicle intermediate the driving and trailing axles, and means connecting the ends of the last-mentioned equalizer member to the trailing axle and to the other end of the first-mentioned equalizer member.

2. In a spring suspension and load equalizing system for motor vehicles embodying a frame and tandem pairs of wheels, a power driven axle for one pair of wheels, a trailing axle for the other pair of wheels, a resilient equalizer member on each side of the vehicle secured intermediate its ends to the power driven axle, means connecting the end of the equalizer member remote from the trailing axle to the frame, a second resilient equalizer member on each side of the vehicle disposed intermediate the driving and trailing axles, a universal joint connecting said equalizer member intermediate its ends to the vehicle frame, laterally yielding means for connecting the adjacent end of said equalizer member to the trailing axle, and means connecting the other end of said second equalizer member to the first mentioned equalizer member.

3. In a spring suspension and load equalizing system for motor vehicles embodying a frame and tandem pairs of wheels, a power driven axle for one pair of wheels, a trailing axle for the other pair of wheels, a resilient equalizer member on each side of the vehicle secured intermediate its ends to the power driven axle, means connecting the end of the equalizer member remote from the trailing axle to the frame, a second resilient equalizer member on each side of the vehicle disposed intermediate the driving and trailing axles, a universal joint connecting said equalizer member intermediate its ends to the vehicle frame, means for connecting the adjacent end of said equalizer member to the trailing axle, and means permitting relative angular movement for connecting the other end of said second equalizer member to the other end of the first-mentioned equalizer member.

4. In a spring suspension and load equalizing system for motor vehicles embodying a frame and tandem pairs of wheels, a power driven axle for one pair of wheels, a trailing axle for the other pair of wheels, a laminated spring equalizer member connected on each side of the vehicle to the power driven axle, means connecting the forward end of said resilient equalizer member to the vehicle frame, a second resilient equalizer member disposed between the driving and trailing wheels on each side of the vehicle, a universal joint connecting said second equalizer member intermediate its ends to the frame, a shackle permitting relative angular movement connecting the forward end of the second equalizer member to the rear end of the first-mentioned equalizer member, a loop on the rear of the second equalizer member embracing the trailer axle and permitting a sliding movement of said axle therein, a shoulder on the axle in spaced relation with the loop, and a coil spring interposed between the loop and the shoulders.

In testimony whereof I affix my signature.

ADOLPH P. BUQUOR.